May 8, 1923.
W. H. READLE
FISH LURE
Filed Aug. 19, 1922
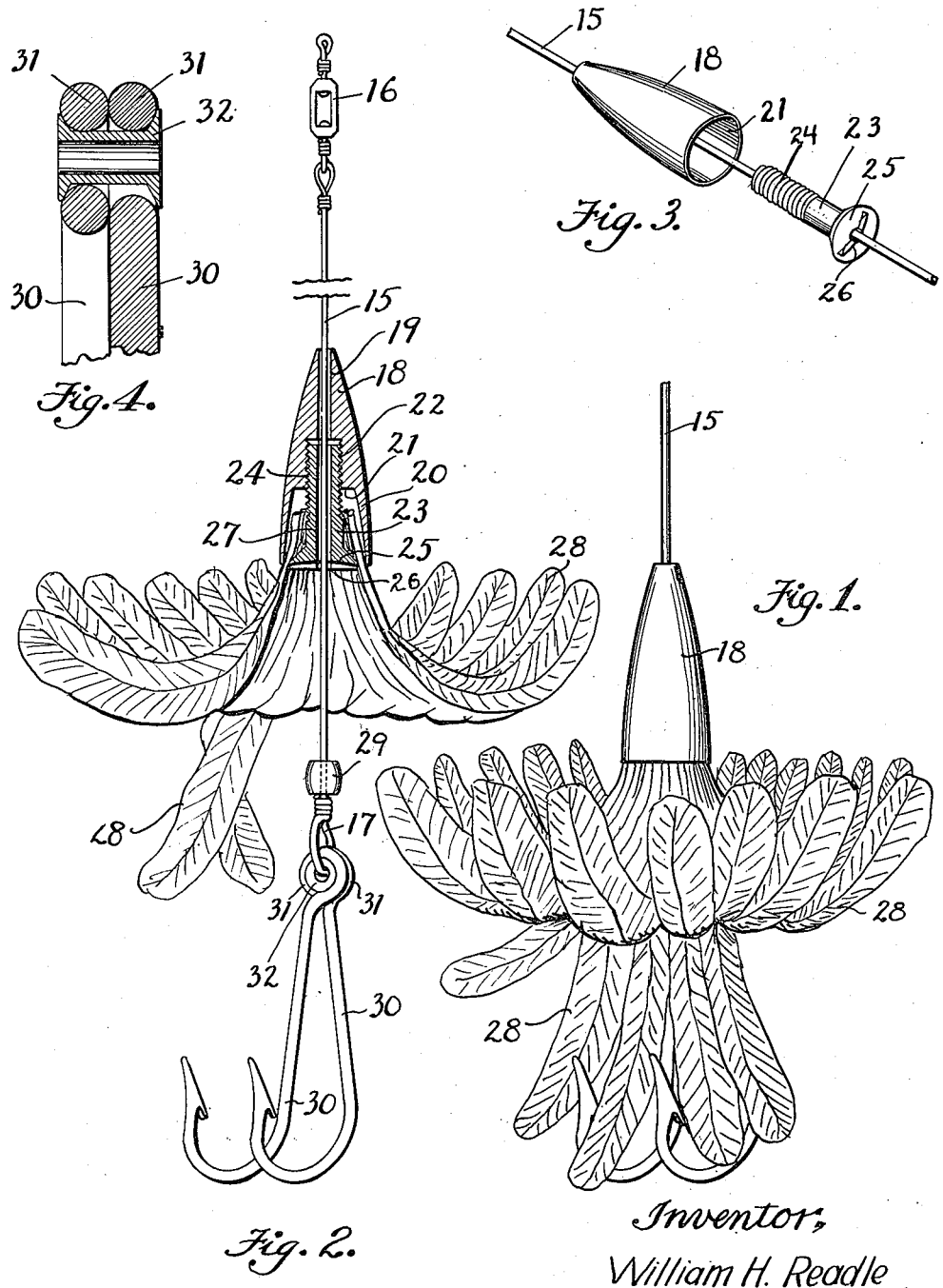
Inventor,
William H. Readle
by Hazard and Miller
ATTORNEYS Patented May 8, 1923.

1,454,820

UNITED STATES PATENT OFFICE.

WILLIAM H. READLE, OF SAN BERNARDINO, CALIFORNIA.

FISH LURE.

Application filed August 19, 1922. Serial No. 582,881.

*To all whom it may concern:*

Be it known that I, WILLIAM H. READLE, a citizen of the United States, residing at San Bernardino, in the county of San Bernardino and State of California, have invented new and useful Improvements in Fish Lures, of which the following is a specification.

My invention relates to fish lures, and a purpose of my invention is the provision of a fish lure having simple, inexpensive and durable means for detachably securing therein luring members, such as feathers and the like, so as to permit of the ready removal thereof when useless and the substitution of new luring members.

It is also a purpose of my invention to provide a fish lure in which the supporting member for the luring element is mounted for rotational movement upon a leader with the least possible friction. Furthermore, my invention provides novel means for maintaining a pair of fish hooks in predetermined position with respect to each other.

Although I have herein shown and described only one form of fish lure embodying my invention, it is to be understood that various changes and modifications may be made herein without departing from the spirit of the invention and the spirit and scope of the appended claims.

In the accompanying drawings,

Figure 1 is a view showing in side elevation one form of fish lure embodying my invention.

Fig. 2 is a view similar to Fig. 1 showing the lure in elevated position with respect to the hooks and in section.

Fig. 3 is a detail perspective view of the lure in disassembled position.

Fig. 4 is an enlarged sectional view of the securing means for the hooks of the lure.

Referring specifically to the drawings in which similar reference characters refer to similar parts, my invention, in its present embodiment, comprises a leader 15, preferably formed of wire and provided at one end with a swivel 16 and at its opposite end with a loop 17 formed by bending the wire in loop formation and coiling the end thereof about the leader.

A supporting member designated at 18 is bored longitudinally as indicated at 19, and through this opening the leader 15 is extended so as to slidably support the member between the swivel 16 and the loop 17. The member 18 is preferably of frusto-conical form as clearly shown in Fig. 2, and is provided with an annular flange 20 which cooperates with the member to form a cup 21. This cup has communication at its inner end with the threaded bore 22 adapted to receive a securing member 23, which latter, in the present instance, is in the form of a screw having a threaded shank 24 engaging the wall of the bore 22 and a head 25 provided with a transverse slot 26 to permit of the ready application of a screw driver or other suitable tool thereto. This screw 23 is bored longitudinally as indicated at 27, and as clearly shown in Figs. 2 and 3, the leader is slidably extended through this bore. The bore 27 is in longitudinal alinement with the bore 19 so as to permit of the supporting member and securing member having sliding as well as rotational movement upon the leader.

The supporting and securing members are adapted to sustain a plurality of luring members, such as feathers 28, and to this end the shafts of the feathers are extended into the cup 21 in circular formation about the screw 23. To permit of the insertion of the feather shafts, it will be understood that the screw is partly or completely withdrawn from the supporting member 18, and after the feather shafts have been applied, the screw is adjusted so that the head 25 cooperates with the flange 20 in securely gripping the feather shafts and thereby holding the feathers in circular formation and against accidental displacement from the supporting member.

From the foregoing, it will be clear that after repeated use of the feathers to such an extent that they lose their proper contour or shape and consequently become useless, they may be readily removed by outward adjustment of the screw 23, and new feathers substituted.

To insure of the unrestricted rotation of the lure upon the leader, a bearing bead 29 is provided, such bead being loosely mounted upon the leader 15 at a point directly above the loop 17. In the normal position of the lure, the screw head 25 engages the bearing bead 29, as clearly shown in Fig. 1 so that the lure as a unit is supported for rotational movement upon the leader.

As shown in Fig. 2, the loop 17 carries a pair of hooks 30, and these hooks are provided with eyes 31 through which is extended a tubular member or rivet 32. The opposite ends of the rivet are swaged as clearly shown in Fig. 4, thereby rigidly securing the eyes together and in such manner as to maintain the bills of the hooks in permanent spaced relation to each other.

By referring to Fig. 1, it will be seen that by employing relatively straight feathers, the hooks may be partly concealed thus rendering the lure more effective in the catching of fish.

What I claim is:

1. A fish lure, comprising a supporting member, and a securing member associated with the supporting member to detachably secure the luring members within the supporting member, both of said members being formed to rotatably receive a leader.

2. A fish lure comprising a supporting member, and a securing member adjustably associated with the supporting member to detachably secure the luring members within the supporting member, both of said members being bored longitudinally to slidably and rotatably receive a leader.

3. A fish lure comprising a supporting member, and a screw adjustably associated with the member for securing luring members within the supporting member, both of said members being formed to slidably and rotatably receive a leader.

4. A fish lure comprising a supporting member, and a screw adjustably associated with the supporting member for securing luring members on the supporting member, both of said members being bored longitudinally to rotatively receive a leader.

5. A fish lure comprising a supporting member having a cup formed at one end in which luring members are adapted to be extended, and a member adjustably associated with the supporting member and extending into said cup for securing the luring members within the cup, both of said members being bored to rotatably receive a leader.

6. In combination, a leader, a supporting member slidably and rotatably mounted on the leader, a securing member adjustably associated with the supporting member for securing luring members on the supporting member, said securing member being rotatable on the leader, a loop formed on the lower end of the leader and constituting the securing means for hooks, and a bearing member rotatably mounted on the leader above said loop and against which said securing member is adapted to bear.

7. In combination, a leader having a loop formed on one end thereof, hooks having eyes extended through the loop, and a fastening member extending through the eyes for rigidly maintaining the hooks in spaced relation to each other.

8. In combination, a leader, members rotatably mounted on the leader and cooperating to detachably secure luring members thereon, hook securing means on the leader, and a bearing member on the leader above said hook securing means and against which one of the first members is adapted to bear.

9. A fish lure comprising a supporting member having a cup formed at one end in which luring members are adapted to be extended, and means associated with the supporting member and extending into said cup for detachably securing the luring members within the cup, said member and means being formed to rotatably receive a leader.

In testimony whereof I have signed my name to this specification.

WILLIAM H. READLE.